US006787223B2

(12) United States Patent
Warren

(10) Patent No.: US 6,787,223 B2
(45) Date of Patent: Sep. 7, 2004

(54) FLEXURE AND PRECISION CLAMP

(75) Inventor: Peter A. Warren, Newton, MA (US)

(73) Assignee: Foster-Miller, Inc., Waltham, MA (US)

( * ) Notice: Subject to any disclaimer, the term of this patent is extended or adjusted under 35 U.S.C. 154(b) by 105 days.

(21) Appl. No.: 10/092,891

(22) Filed: Mar. 6, 2002

(65) Prior Publication Data

US 2003/0168794 A1 Sep. 11, 2003

(51) Int. Cl.$^{7}$ .................................................. B32B 5/16

(52) U.S. Cl. .................... 428/323; 428/174; 428/297.4; 428/299.1; 428/367; 428/372; 428/293.1

(58) Field of Search .............................. 428/174, 293.1, 428/297.4, 299, 367, 372, 245.4, 292.4, 293.7, 294.7, 295.4, 299.1; 156/182, 60

(56) References Cited

U.S. PATENT DOCUMENTS

| | | | | | |
|---|---|---|---|---|---|
| 5,800,568 | A | * | 9/1998 | Atkinson et al. | 623/52 |
| 5,826,304 | A | * | 10/1998 | Carlson | 16/225 |
| 6,174,595 | B1 | * | 1/2001 | Sanders | 428/295.4 |
| 6,350,286 | B1 | * | 2/2002 | Atkinson et al. | 623/52 |
| 6,632,310 | B2 | * | 10/2003 | Freeman et al. | 156/182 |

* cited by examiner

*Primary Examiner*—Merrick Dixon
(74) *Attorney, Agent, or Firm*—Iandiorio & Teska

(57) ABSTRACT

A flexure including a plurality of plies of composite material consolidated everywhere except at at least one predefined region where preselected adjacent plies are purposefully delaminated so they can move relative to each other when the flexure is bent.

10 Claims, 7 Drawing Sheets

FLEXURE AND PRECISION CLAMP

GOVERNMENT RIGHTS

This invention was made with U.S. Government support under Contract No. F04701-99-C-0026 awarded by the U.S. Air Force. The Government may have certain rights in the subject invention.

FIELD OF THE INVENTION

This invention relates to a novel composite flexure and a unique precision clamp incorporating a number of the composite flexures.

BACKGROUND OF THE INVENTION

Flexures, generally stiff along their axis and flexible off axis are used in latches, clamps, and mounts and the like where it is desirable that the flexure bends without yielding but then springs back into its original position. Prior art flexures are typically unitary in construction made of spring steel or titanium, for example. Such flexures are also limited in thickness to provide the desired lateral flexibility and thus may suffer from reduced axial stiffness.

Composite materials are renowned for their high stiffness and strength to weight ratios, and low thermal expansion characteristics. Traditional components made of composite materials, however, do not readily flex or bend easily nor are they designed to do so.

Accordingly, to our knowledge, no one has taught or suggested the construction of a flexure made of composite materials. Such a flexure would be desirable because of its high axial stiffness, and low thermal expansion.

SUMMARY OF THE INVENTION

It is therefore an object of this invention to provide a flexure made of composite materials.

It is a further object of this invention to provide such a flexure which is lightweight and yet very stiff and has low thermal expansion.

It is a further object of this invention to provide a method of manufacturing such a composite flexure.

It is a further object of this invention to provide a latch or clamp incorporating composite flexures.

The invention results from the realization that a novel composite flexure which is stiff along its longitudinal axis but flexible off axis can be effected by purposefully delaminating adjacent plies at a preselected regions so they can move relative to each other when the flexure is subjected to bending loads.

This invention features a flexure comprising a plurality of plies of composite material consolidated everywhere except at at least one predefined region where preselected adjacent plies are purposefully delaminated so they can move relative to each other when the flexure is bent.

The plies are typically grouped together in a number of consolidated layers except at the predefined region where there is no consolidation between adjacent layers. In the preferred embodiment, there are a number of consolidated layers each including a plurality of plies except at the predefined region where there are less layers and no consolidation between adjacent layers.

The flexure is typically substantially longer than it is thick and substantially longer than it is wide. In one embodiment, the plies include axial carbon fibers embedded in a resin matrix. The method of manufacturing a flexure, in accordance with this invention, includes forming a plurality of composite plies into a number of layers; placing between two adjacent layers a non-impregnatable material at a predefined region therebetween which interrupts another layer disposed between the two adjacent layers; applying heat and pressure to consolidate all the layers except at the predefined region; and removing the non-impregnatable material.

The layers may include plies of axial carbon fibers embedded in a resin matrix and each layer is at least partially consolidated except the interrupted layer which may be a prepreg. One possible non-impregnatable material is a number of metallic shims. The flexure of this invention includes a number of plies of composite material consolidated everywhere except at at least one predefined region where preselected adjacent plies are purposefully delaminated so they can move relative to each other when the flexure is bent, the plies group together in a number of consolidated layers except at the predefined region where there is no consolidation between adjacent layers. A plurality of plies of composite material are consolidated everywhere except at at least one predefined region where preselected adjacent plies are purposely delaminated so that they can move relative to each other when the flexure is bent. The flexure includes a number of consolidated layers each including a plurality of plies except at the predefined region where there are less layers and no consolidation between adjacent layers.

The latch assembly of this invention includes a tang and a clamp which receives the tang. The clamp includes: a base; and at least two flexures extending from the base spaced from each other defining opposing jaws which, when flexed away from each other, accept the tang therebetween and which when released secure the tang in the clamp between the jaws. Each flexure typically includes a plurality of plies of composite material consolidated everywhere except at at least one predefined region where preselected adjacent plies are purposely delaminated so that they can move relative to each other when the flexure is bent. Each clamp jaw may include a number of flexures and may include an end cap secured to the terminal ends of the plurality of flexures. Typically, each clamp jaw includes at least two spaced flexures. Each clamp jaw may include two sets of spaced flexures. Each clamp jaw may include a bearing attached thereto. A spreader assembly may also be included to urge the jaws apart. The tang may also include flexures.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
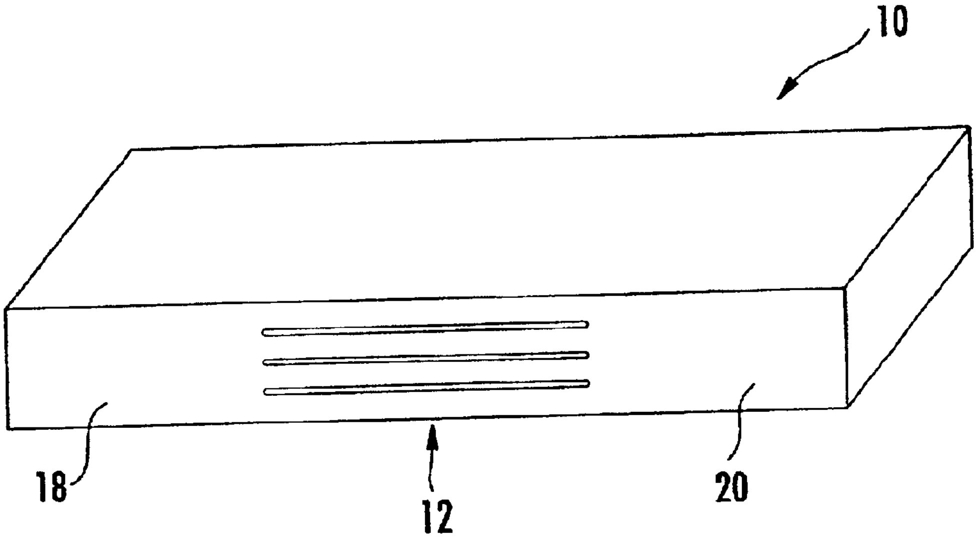
FIG. 1 is a schematic view of a composite flexure in accordance with the subject invention.

Composite flexure 10, FIGS. 1–4 includes a number of plies of composite material consolidated everywhere except at at least one predefined region 12 where preselected adjacent plies are purposefully delaminated so they can move relative to each other when the flexure is bent. The individual plies 14 are typically grouped together in a number of consolidated layers 16 except at the predefined region 12 where there is no consolidation between adjacent layers. Thus, in regions 18 and 20, there are, for example, 7 layers each made of numerous plies 14 while in region 12 there are only 4 layers also made of numerous plies 114. Flexure 10 is normally substantially longer than it is thick and also substantially longer than it is wide.

In one embodiment, the plies each include axial carbon fibers embedded in a resin matrix as is known in the composite arts. But, by purposefully delaminating adjacent plies in region 12, they can move with respect to each other when flexure 10 is bent under the action of load L FIG. 2. When load L is removed, flexure 10 springs back to its original position. The delamination of adjacent plies at region 12, however, does not otherwise adversely affect the axial strength of flexure 10.

Figure 5:
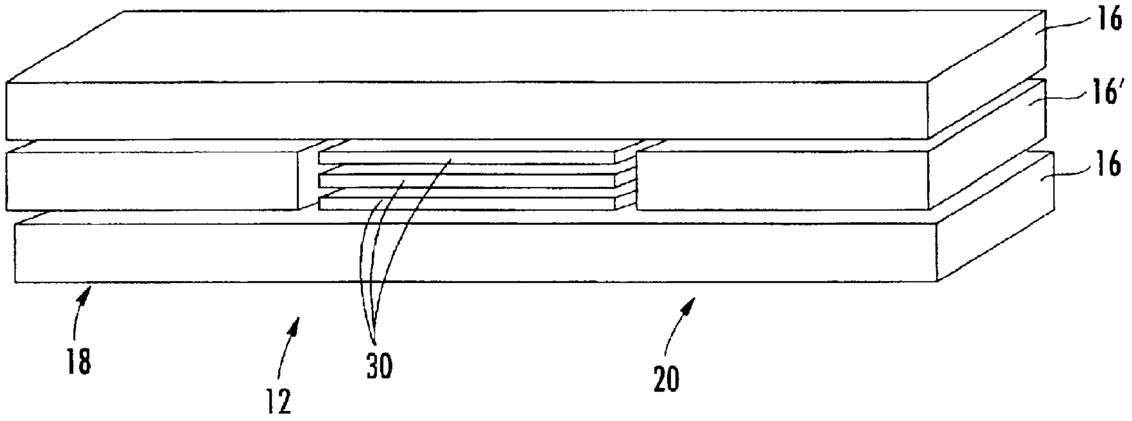
FIG. 5 is an exploded schematic view of the flexure shown in FIG. 4.

The method of manufacturing flexure 10 typically includes forming a plurality of composite plies 14 into a number of layers 16 and placing, between each pair of adjacent layers at region 12, a non-impregnatable material such as metallic shims 30, FIG. 5 which interrupts layer 16' disposed between the adjacent layers 16. Heat and pressure is then applied to consolidate all the layers except at predefined region 12. The metallic shims 30 are then removed.

Figure 2:
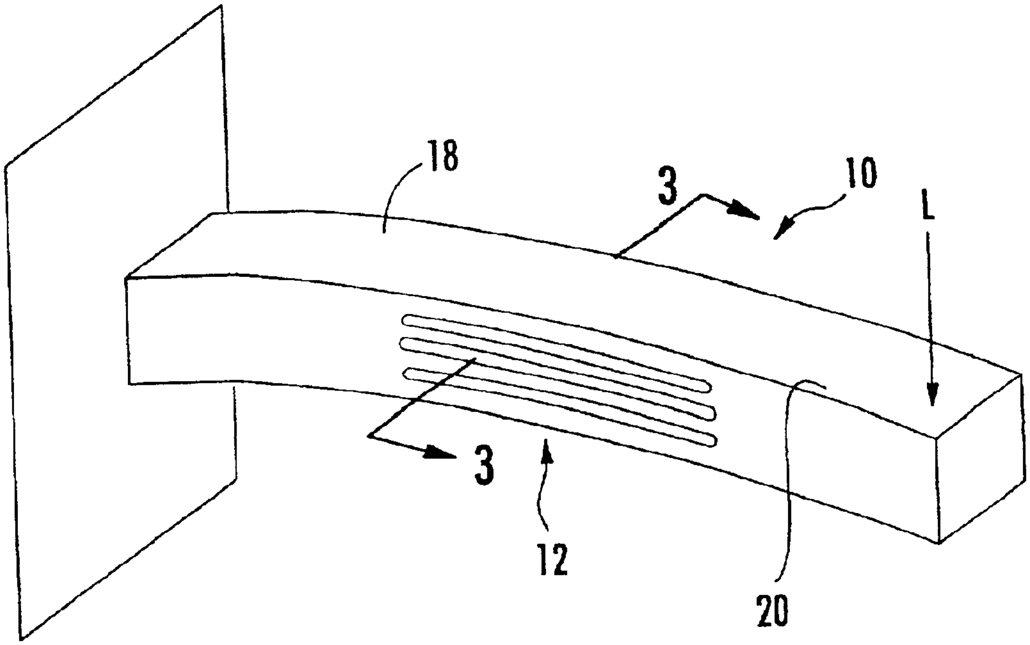
FIG. 2 is a schematic view of the composite flexure shown in FIG. 1 subjected to a bending load.
Figure 3:
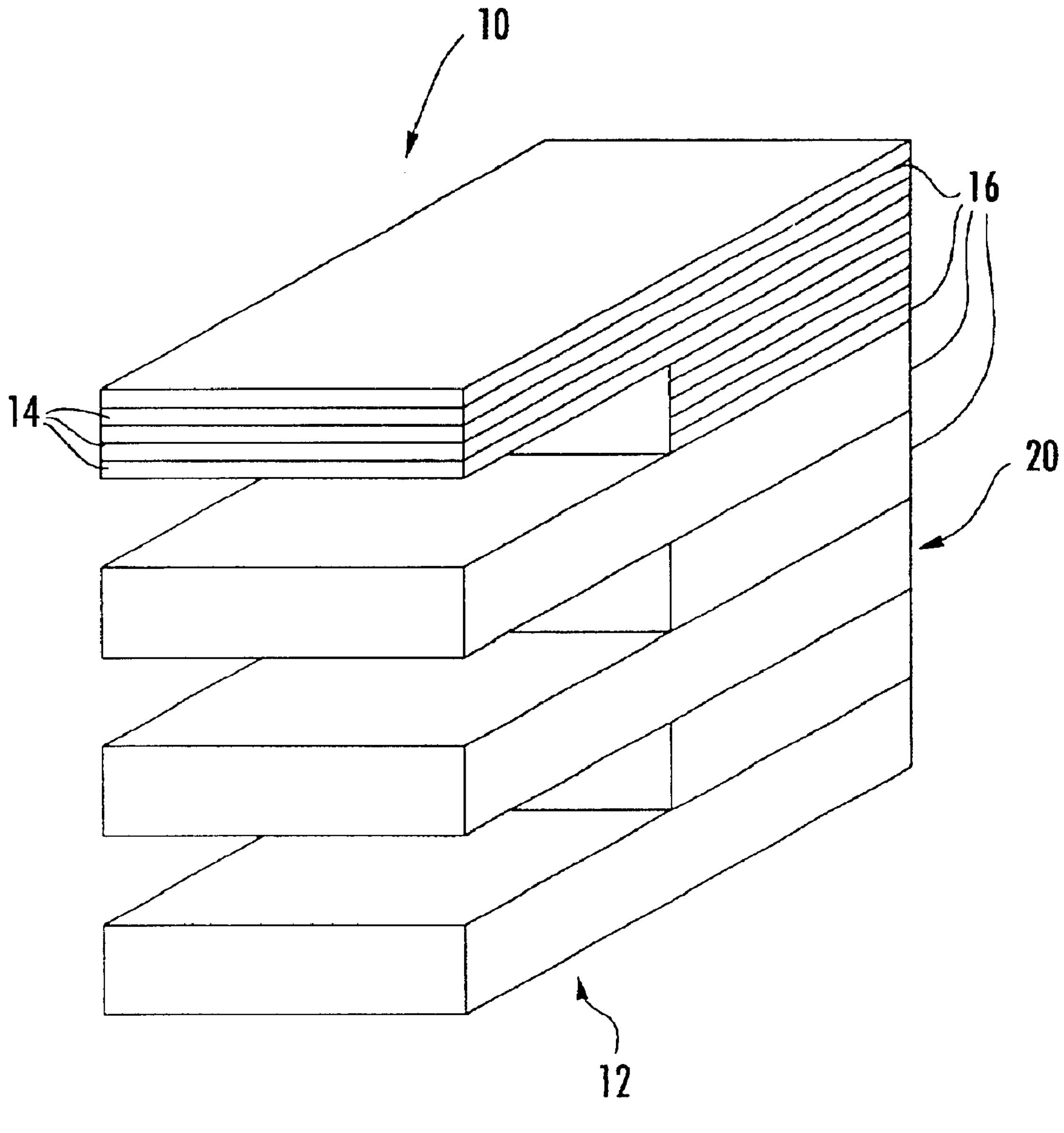
FIG. 3 is a schematic view of the composite flexure of the subject invention taken along line 3—3 of FIG. 2.
Figure 4:
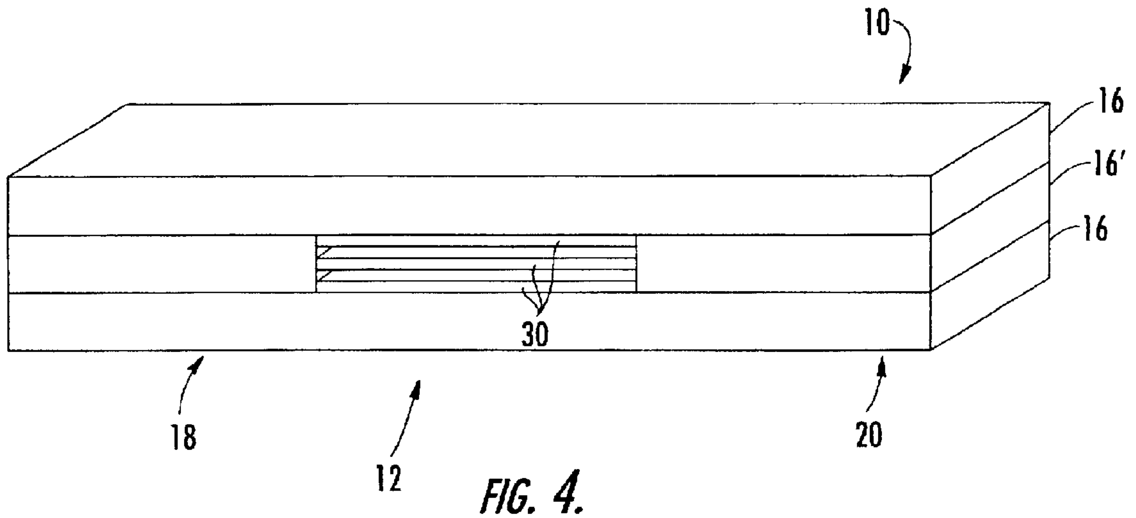
FIG. 4 is a schematic view of the composite flexure of the subject invention showing how shims are placed between adjacent plies or layers in the pre-defined bending region to purposefully delaminate adjacent plies so that they can move relative to each other when the flexure is bent.

In one embodiment, layers 16 are at least partially consolidated while interrupted layer 16', in contrast, is a prepeg material which has not yet been consolidated. Then, when heat and pressure are applied, prepeg layers 16' consolidates with layers 16 at regions 18 and 20 but not at region 12. As such, there is no consolidation between layers 16 at region 12. The result is that layers 16 can move relative to each other when flexure 10, FIG. 2 is subjected to bending load L. It is not a necessary requirement of the subject invention that the individual plies be grouped together in layers, however. Instead, all the plies could be laid down in a stack and the metallic shims placed between adjacent plies to prevent adjacent plies from ultimately being consolidated in the predefined bending region. The axial compressive stiffness of rectangular cross section flexure 10, FIGS. 1–2 is proportional to its cross sectional area, or its base width (b) multiplied by its height (h):

$$\text{Axial stiffness} \sim bh \tag{1}$$

The bending stiffness is proportional to its cross sectional moment of inertia which is given by:

$$\frac{(b*h^3)}{12} \tag{2}$$

For a flexure to be effective, the axial stiffness is much greater than the bending stiffness. Traditionally, the flexure is made very thin, making h very small so that when the height, h, is cubed, the moment of inertia is very small. This, however, limits the design of some components because of the need for high axial stiffness and thus need to have a very wide, thin component.

In the subject invention, h is split into several parts, maintaining the required area, but breaking up the moment of inertia so that the strips (layers 16, FIG. 3) within the flexure are more flexible in bending than the whole flexure would be if it was cohesively joined. Thus, if h is split into 3 sections, the area would then be:

$$\frac{bh}{3} + \frac{bh}{3} + \frac{bh}{3} = bh \tag{3}$$

It would have the same area and thus stiffness, but the moment of inertia is then reduced to:

$$\frac{b\left(\frac{h}{3}\right)^3}{12} + \frac{b\left(\frac{h}{3}\right)^3}{12} + \frac{b\left(\frac{h}{3}\right)^3}{12} = \frac{bh3}{108} \tag{4}$$

vs.

$$\frac{bh3}{12}$$

for the original flexure. This is a reduction of a factor of 9. Similarly, there will be a factor of $N^2$ reduction in the bending stiffness for N the number of delaminated sections. Thus, the delaminations shown at 12 in FIGS. 1–2 provide for a much lower bending stiffness for the desired axial stiffness.

Figure 6:
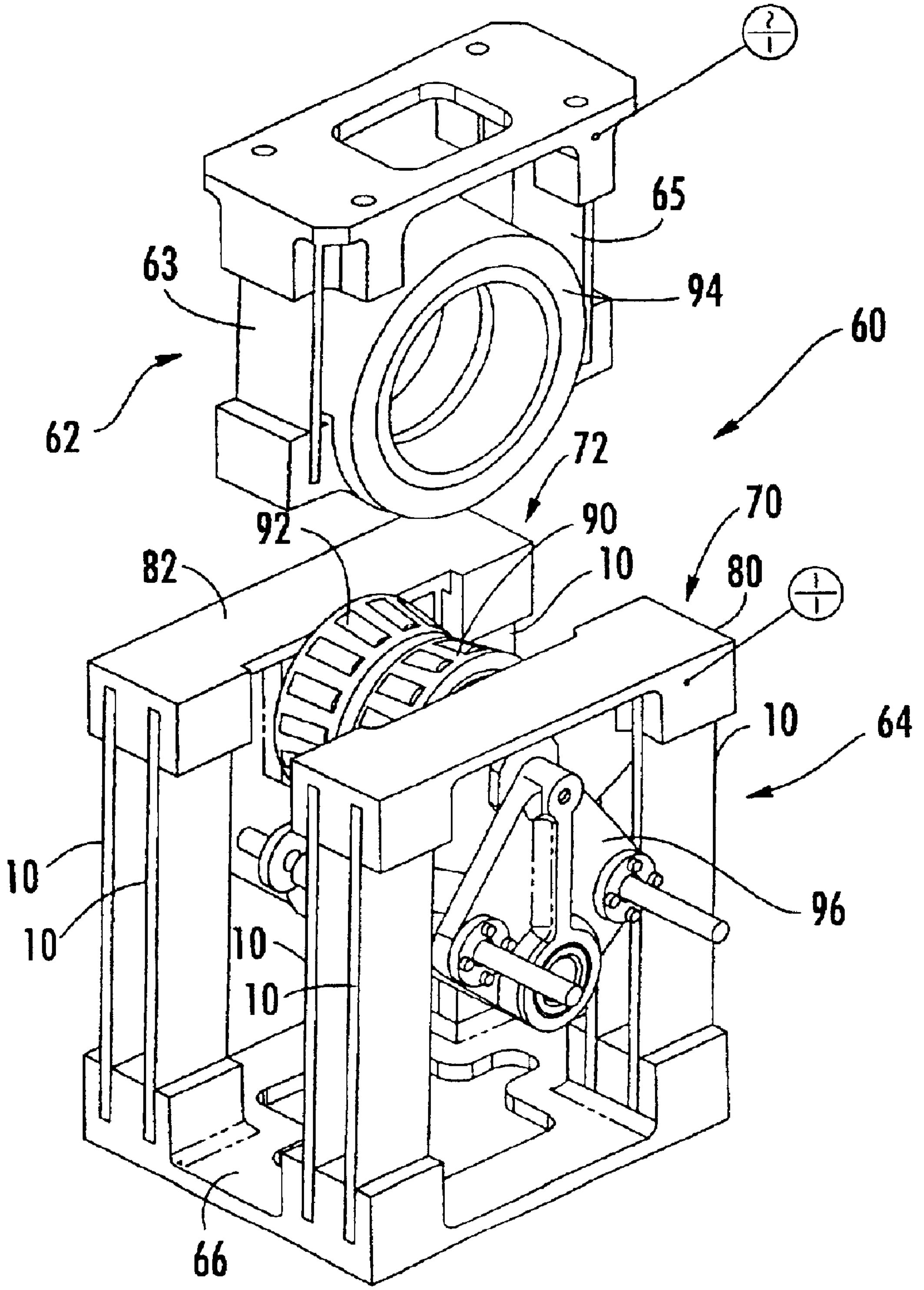
FIG. 6 is a three dimensional schematic view of a precision clamp incorporating the composite flexure of the subject invention.
Figure 7:
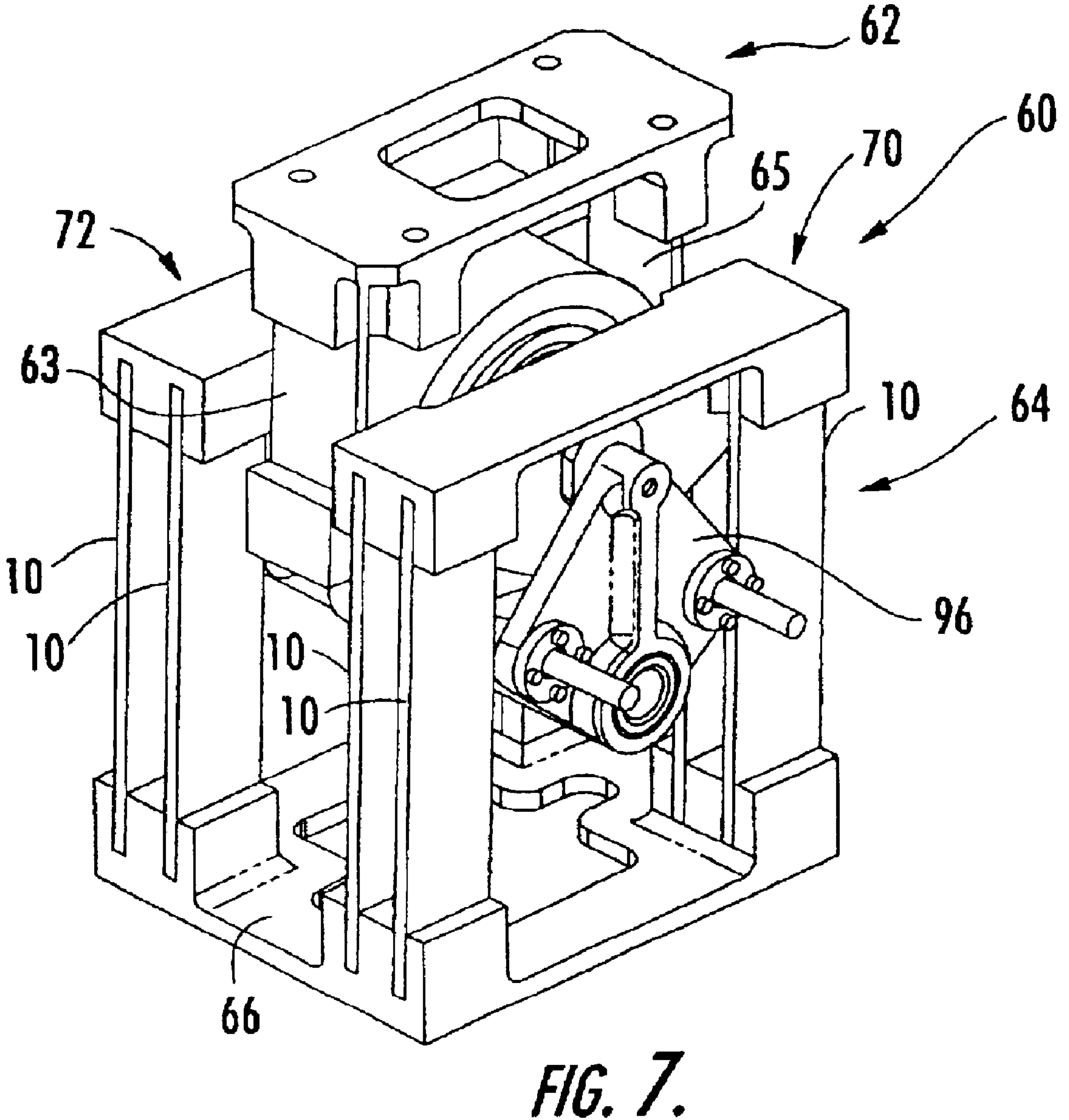
FIG. 7 is a view similar to FIG. 6 except now the jaws of the clamp are spread slightly apart in order to receive the tang of the precision clamp.

In any embodiment, the composite flexures of the subject invention can be used with latch assembly 60, FIGS. 6–7. Latch assembly 60 includes tang 62 and clamp 64 which receives tang 62. Clamp 64 includes base 66 and flexures 10 extending from base 66 spaced from each other defining opposing jaws 70 and 72. Jaws 70 and 72, when flexed away from each other as shown in FIG. 7, accept tang 62 therebetween. When jaws 70 and 72 are released, they secure tang 62 in clamp 60. As shown, each clamp jaw 70, 72 typically includes end caps 80, 82 secured to the terminal ends of the flexures. In this specific design, each clamp jaw 70, 72 includes two spaced sets of flexures 10, two spaced flexures per set. Also, each clamp jaw 70, 72 includes bearing 90, 92 attached thereto which are received in journal 94 of tang 62. Spreader assembly 96 is used to urge jaws 70 and 72 apart in order to receive tang 62. Flexures 63 and 65 in tang 62 provide flexibility in a direction orthogonal to the direction of flexibility of flexures 10 of clamp 64.

Figure 8:
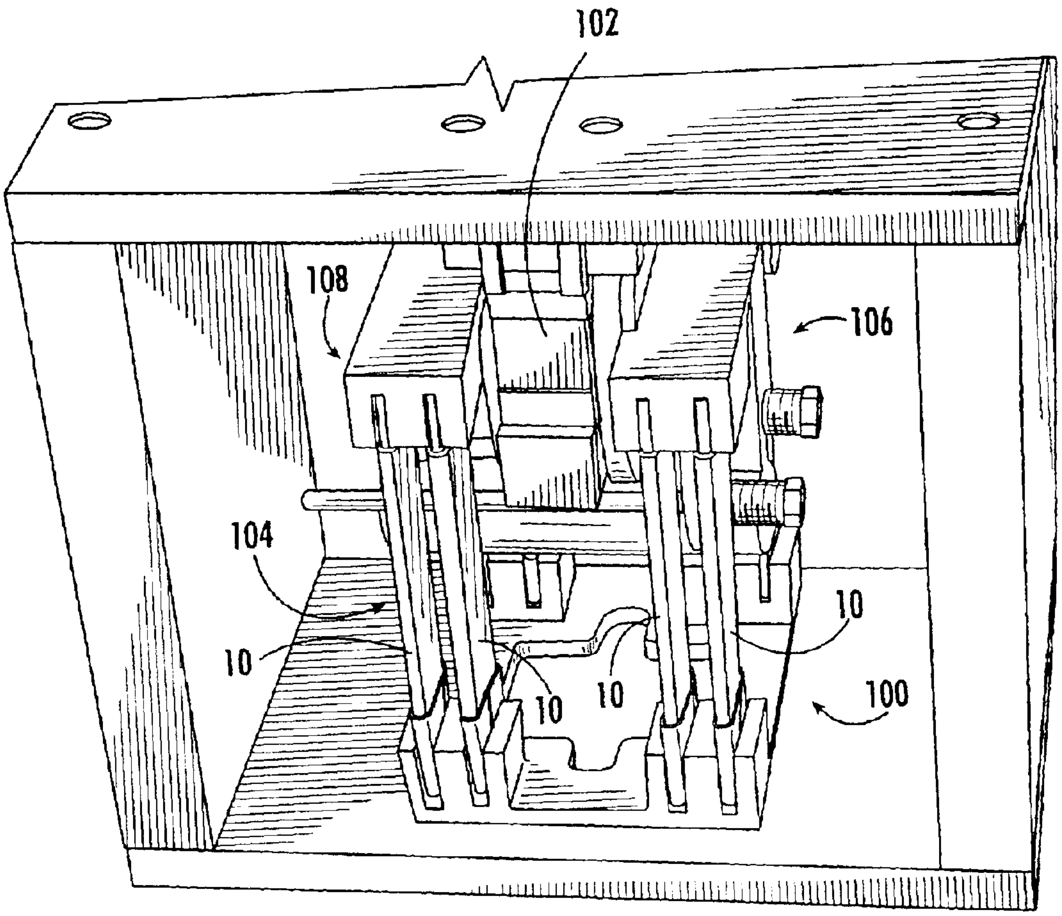
FIG. 8 is a front view of a precision clamp in accordance with the subject invention.
Figure 9:
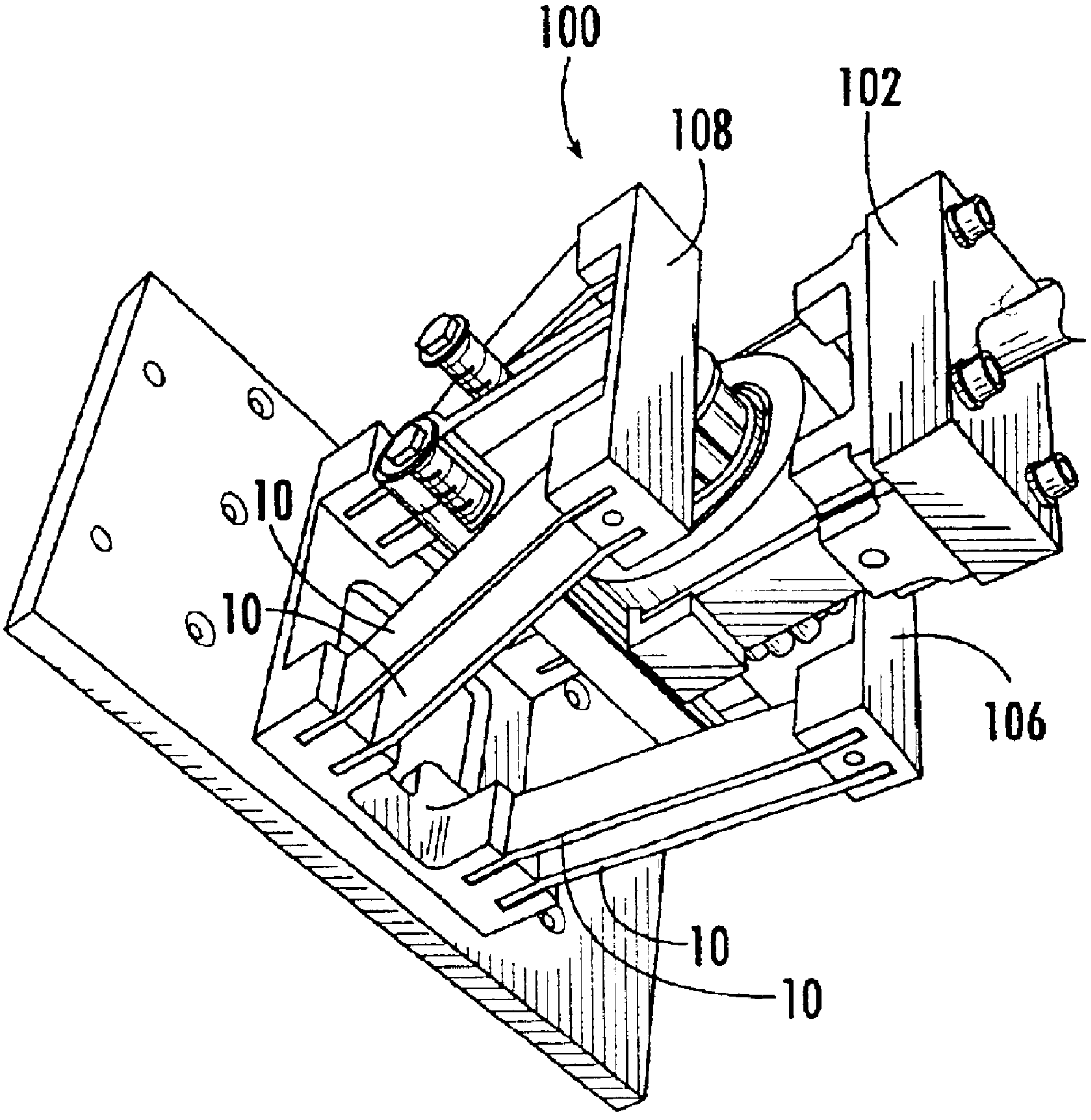
FIG. 9 is a front view of the precision clamp shown in FIG. 8 with the jaws of the clamp spread apart to accept the tang.

Latch assembly 100, FIGS. 8–9 also includes tang portion 102 and clamp portion 104 which receives tang 62 between jaws 106 and 108. See FIG. 8. Flexures 10 are made of carbon fibers in the axial direction only. FIG. 9 shows the flexing of flexures 10 in order to accept tang 102 between jaws 106 and 108.

The use of the composite flexures disclosed herein, however, is not limited to the latch assembly shown in FIGS.

6 and 7 and those skilled in the art will understand how to implement them in other environments including, but not limited to, other clamps, latches, mounts, and the like.

Although specific features of the invention are shown in some drawings and not in others, this is for convenience only as each feature may be combined with any or all of the other features in accordance with the invention. The words “including”, “comprising”, “having”, and “with” as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A flexure comprising:

a plurality of plies of composite material consolidated everywhere except at at least one predefined region where preselected adjacent plies are purposefully delaminated so they can move relative to each other when the flexure is bent.

2. The flexure of claim 1 in which the plies are grouped together in a number of consolidated layers except at the predefined region where there is no consolidation between adjacent layers.

3. The flexure of claim 1 in which there are a number of consolidated layers each including a plurality of plies except at the predefined region where there are less layers and no consolidation between adjacent layers.

4. The flexure of claim 1 in which the flexure is substantially longer than it is thick.

5. The flexure of claim 4 in which the flexure is substantially longer than it is wide.

6. The flexure of claim 5 in which the flexure is substantially longer than it is thick and substantially longer than it is wide.

7. The flexure of claim 1 in which the plies include axial carbon fibers embedded in a resin matrix.

8. A flexure comprising:

a number of plies of composite material consolidated everywhere except at at least one predefined region where preselected adjacent plies are purposefully delaminated so they can move relative to each other when the flexure is bent, the plies group together in a number of consolidated layers except at the predefined region where there is no consolidation between adjacent layers.

9. A flexure comprising:

a plurality of plies of composite material consolidated everywhere except at at least one predefined region where preselected adjacent plies are purposely delaminated so that they can move relative to each other when the flexure is bent, the flexure including a number of consolidated layers each including a plurality of plies except at the predefined region where there are less layers and no consolidation between adjacent layers.

10. A composite flexure.

* * * * *